United States Patent
Emmadi et al.

(10) Patent No.: US 11,681,827 B2
(45) Date of Patent: Jun. 20, 2023

(54) METHOD AND SYSTEM FOR ENABLING PRIVACY IN AN APPLICATION USING FULLY HOMOMORPHIC ENCRYPTION

(71) Applicant: Tata Consultancy Services Limited, Mumbai (IN)

(72) Inventors: Nitesh Emmadi, Hyderabad (IN); Rajan Mindigal Alasingara Bhattachar, Bangalore (IN); Harika Narumanchi, Chennai (IN); Imtiyazuddin Shaik, Hyderabad (IN); Ajeet Kumar Singh, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 164 days.

(21) Appl. No.: 17/361,375

(22) Filed: Jun. 29, 2021

(65) Prior Publication Data
US 2022/0035951 A1    Feb. 3, 2022

(30) Foreign Application Priority Data
Jul. 1, 2020    (IN) .............................. 202021028022

(51) Int. Cl.
*G06F 21/62* (2013.01)
*G06F 21/60* (2013.01)
*H04L 9/00* (2022.01)

(52) U.S. Cl.
CPC ........ *G06F 21/6263* (2013.01); *G06F 21/602* (2013.01); *H04L 9/008* (2013.01)

(58) Field of Classification Search
CPC ... G06F 21/6263; G06F 21/602; H04L 9/008; G06N 3/08; G06N 5/01; G06N 20/00
See application file for complete search history.

(56) References Cited

U.S. PATENT DOCUMENTS

| | | | |
|---|---|---|---|
| 10,075,289 B2* | 9/2018 | Laine | G09C 1/00 |
| 11,443,182 B2* | 9/2022 | Gu | G06N 3/063 |
| 11,443,240 B2* | 9/2022 | Peterson | G06N 3/04 |
| 11,562,293 B2* | 1/2023 | Ghanea-Hercock | G06F 21/602 |

(Continued)

OTHER PUBLICATIONS

Alexander Viand et al., "Marble: Making Fully Homomorphic Encryption Accessible to All," Workshop on Encrypted Computing & Applied Homomorphic Cryptography, Oct. 2018, pp. 49-60, ACM, https://www.researchgate.net/publication/328325418_Marble_Making_Fully_Homomorphic_Encryption_Accessible_to_All/link/5bce2f30299bf1a43d9a3747/download.

(Continued)

*Primary Examiner* — Meng Li
(74) *Attorney, Agent, or Firm* — Finnegan, Henderson, Farabow, Garrett & Dunner, LLP

(57) ABSTRACT

The disclosure herein generally relates to the field of privacy preserving in an application, and, more particularly, to enabling privacy in an application using fully homomorphic encryption. The disclosure more specifically refers to enabling a most optimal FHE for privacy preserving for the application based on a set of constraints using a disclosed set of optimization tasks. The set of optimization tasks comprise a multi objective-multi constraint optimization task and a single objective-multi constraint optimization task, that identifies an optimal FHE library, along with an associated FHE functionality and an optimal configuration of the associated FHE functionality based on the set of constraints. The identified FHE library along with the associated FHE functionality and the optimal configuration of the associated FHE functionality facilitate optimal implementation of privacy in the applications.

15 Claims, 9 Drawing Sheets

(56) References Cited

U.S. PATENT DOCUMENTS

| | | | | |
|---|---|---|---|---|
| 2006/0271210 | A1* | 11/2006 | Subbu | G06N 3/126 |
| | | | | 700/44 |
| 2017/0134156 | A1* | 5/2017 | Laine | H04L 9/008 |
| 2017/0317963 | A1* | 11/2017 | Gupta | G06N 20/00 |
| 2018/0300334 | A1* | 10/2018 | Saha | G06F 16/9535 |
| 2019/0036678 | A1* | 1/2019 | Ahmed | H04L 9/302 |
| 2020/0076570 | A1* | 3/2020 | Musuvathi | G06F 21/72 |
| 2020/0213079 | A1* | 7/2020 | Kreeger | H04L 9/008 |
| 2020/0366459 | A1* | 11/2020 | Nandakumar | G06N 3/084 |
| 2021/0376995 | A1* | 12/2021 | Ratha | H04L 9/3265 |
| 2022/0035951 | A1* | 2/2022 | Emmadi | G06F 21/602 |
| 2022/0247551 | A1* | 8/2022 | Joye | H04L 9/008 |

OTHER PUBLICATIONS

Sungwook Kimy et al., "Efficient Privacy-Preserving Matrix Factorization via Fully Homomorphic Encryption," ACM Transactions on Privacy and Security, Oct. 2018, vol. 21, Issue: 4 pp. 1-30, Publisher: ACM, https://eprint.iacr.org/2016/232.pdf.

Qiang Wei et al., "Privacy-aware cross-cloud service recommendations based on Boolean historical invocation records," EURASIP Journal on Wireless Communications and Networking, 2019, Springer, https://jwcn-eurasipjournals.springeropen.com/track/pdf/10.1186/s13638.019-1432-2.pdf.

Dongsheng Li et al., "An algorithm for efficient privacy-preserving item-based collaborative filtering," Future Generation Computer Systems, Feb. 2016, vol. 55, pp. 311-320 Elsevier, https://www.researchgate.net/publication/269730227_An_algorithm_for_efficient_privacy-preserving_item-based_collaborative_filtering/link/5b7a86ca4585151fd121a8dd/download.

* cited by examiner

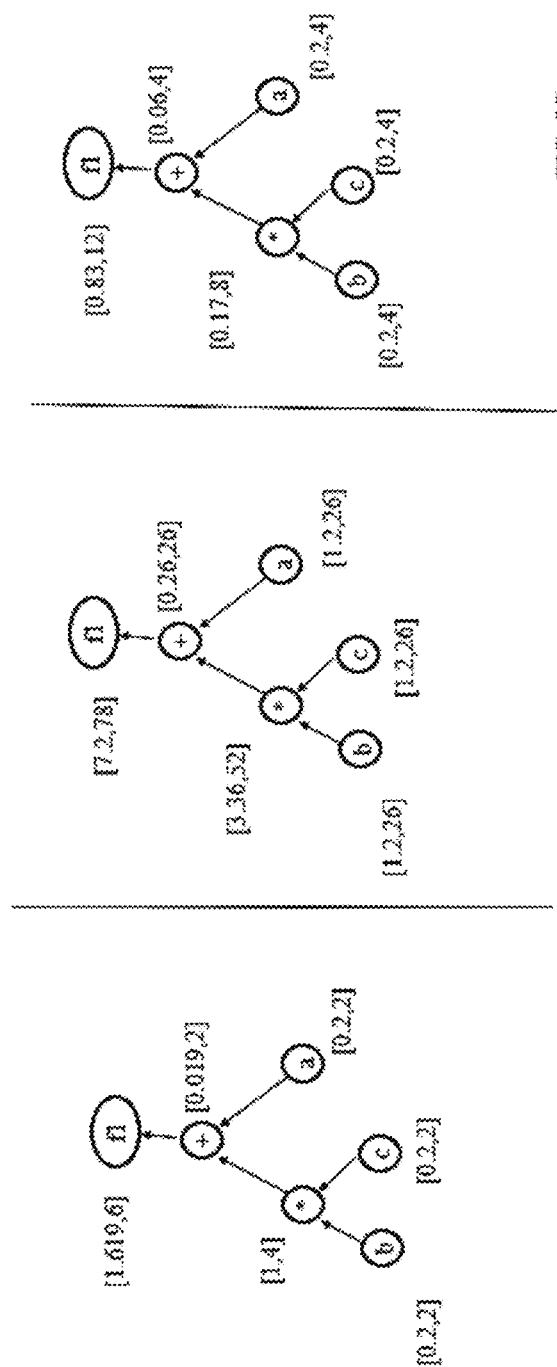

Legend : [time, memory] in [milliseconds (ms), Kilobytes(KB)]

Legend : [time, memory] in [milliseconds (ms) ,Kilobytes(KB)]

METHOD AND SYSTEM FOR ENABLING PRIVACY IN AN APPLICATION USING FULLY HOMOMORPHIC ENCRYPTION

PRIORITY CLAIM

This U.S. patent application claims priority under 35 U.S.C. § 119 to: India Application No. 202021028022, filed on Jul. 1, 2020. The entire contents of the aforementioned application are incorporated herein by reference.

TECHNICAL FIELD

The disclosure herein generally relates to the field of privacy preserving in an application, and, more particularly, a method and a system for enabling privacy in an application using fully homomorphic encryption (FHE).

BACKGROUND

Data driven digital transformation has led to exponential increase of data. The exponential increase in data has increased dependence on cloud service providers (CSPs). Organizations are embracing cloud computing services to outsource storage and computations which can be efficiently managed with low cost over-head. With the increased dependence on cloud computing services, there is a growing concern for privacy of data as the data is stored and processed on third party cloud service providers. Of many solutions that enable privacy preserving computations on CSP, fully homomorphic encryption (FHE) is a promising solution. The FHE enables organizations to securely outsource data storage to CSPs while still allowing computations on the encrypted data without the need for decryption.

Machine learning (ML) provides an ability to automatically learn and improve from feedback or experience without the need for explicit programming. However, existing ML models operate at the cost of a user's data privacy as sensitive data is stored at third party organizations or third party cloud service providers, without any safeguards from the service provider. Hence there is a demand to enable privacy of client's data, for which there is a need to perform privacy enabled Machine Learning or privacy preserving machine learning (PPML).

The existing state of art techniques for implementing PPML focuses on implementing PPML models to solve specific problems such as private genomic sequencing or encrypted computation on genomic data and so on in privacy preserving manner. However these PPML techniques are optimized for a specific given use-case. Further the PPML techniques involve several complicated parameters and for the PPML technique to be efficient it is necessary to select the right parameters and the operating range of the selected parameters. Therefore, there is a need for generic framework that enables end-users to select an appropriate PPML scheme and its parameter set based on the requirements of the PPML applications.

SUMMARY

Embodiments of the present disclosure present technological improvements as solutions to one or more of the above-mentioned technical problems recognized by the inventors in conventional systems. For example, in one embodiment, a method and a system for enabling privacy in an application using fully homomorphic encryption is provided.

In an aspect a method for enabling privacy in an application using fully homomorphic encryption is provided. The method includes receiving, via a one or more hardware processors, the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement. The method further includes generating, via the one or more hardware processors, a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality. The method further includes generating, via the one or more hardware processors, a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints. The method further includes optimizing, via the one or more hardware processors, each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task. The method further includes identifying, via the one or more hardware processors, a pre-defined number of optimal instance models from the set of instance models using a ranking technique, wherein the ranking technique is performed based the set of constraints. The method further includes displaying, via the one or more hardware processors, an optimal instance model, wherein the optimal instance model is indicative of the privacy preservation using FHE to be enabled in the application.

In another aspect, a system for enabling privacy in an application using fully homomorphic encryption is provided. The system is configured for receiving the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement. The system is further configured for generating a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality. The system is further configured for generating a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints. The system is further configured for optimizing each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task. The system is further configured for identifying a pre-defined number of optimal instance models from the set of instance models using a ranking technique, wherein the ranking technique is performed based the set of constraints. The system is further configured for displaying an optimal instance model, wherein the optimal instance model is indicative of the privacy preservation using FHE to be enabled in the application.

In yet another aspect, a non-transitory computer readable medium for a for enabling privacy in an application using fully homomorphic encryption is provided. The program includes receiving, via a one or more hardware processors, the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement. The program further includes generating, via the one or more hardware processors, a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality. The program further includes generating, via the one or more hardware processors, a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints. The program further includes optimizing, via the one or more hardware processors, each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task. The program further includes identifying, via the one or more hardware processors, a pre-defined number of optimal instance models from the set of instance models using a ranking technique, wherein the ranking technique is performed based the set of constraints. The program further includes displaying, via the one or more hardware processors, an optimal instance model, wherein the optimal instance model is indicative of the privacy preservation using FHE to be enabled in the application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A, FIG. 5B and FIG. 5C illustrates a use case of a set of meta models with plurality of nodes, according to some embodiments of the present disclosure FIG. 6A

DETAILED DESCRIPTION

Figure 1:
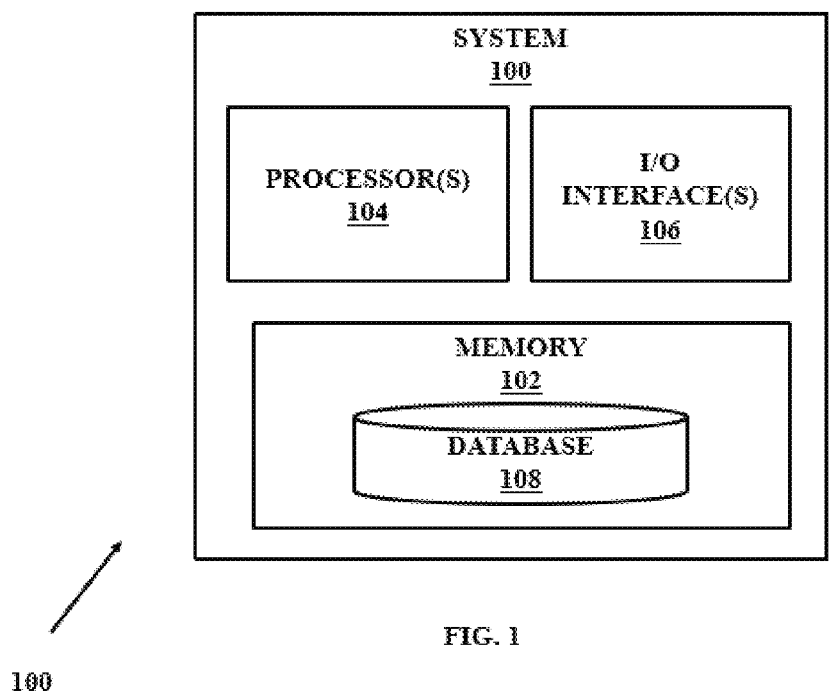
FIG. 1 illustrates a functional block diagram of an exemplary system for enabling privacy in an application using fully homomorphic encryption (FHE) according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Complete Description of Embodiments

The embodiment discloses a method and a system for enabling privacy in an application using fully homomorphic encryption (FHE). The disclosure more specifically refers to enabling a most optimal FHE for enabling privacy preserving for an application based on a set of constraints using a disclosed set of optimization tasks. The set of optimization tasks comprise a multi objective-multi constraint optimization task and a single objective-multi constraint optimization task, that identifies an optimal FHE library, along with an associated FHE functionality and optimal configuration of the associated FHE functionality based on the set of constraints. The identified FHE along with the associated FHE functionality and the optimal configuration of the associated FHE functionality facilitate optimal FHE implementation in applications.

The expression "application" in the context of the present disclosure refers to a software/Information technology(IT) application for which privacy preservation is to be enabled. In an embodiment, the application or the software application can refer to a machine learning application, wherein privacy preservation is to be enabled in for ML datasets or ML algorithms of the machine learning application. In another embodiment, the application or the software application include private information retrieval and authentication systems. A computing device may include hardware and software collectively configured to host the IT application for performing various functions.

The terms FHE and FHE library have been used interchangeably in the description, wherein Fully homomorphic encryption (FHE) or FHE library enables arbitrary computations on encrypted data from an application without decrypting them. Given a set of ciphertexts corresponding to a set of messages, a function can be computed resulting in an encrypted output, which when decrypted is equal to the result of computation. A typical public key encryption algorithm has several functions that perform generation of public and private key pairs, encrypting a message with public key and decrypt a message with private key respectively. In addition to these functions, FHE encryption algorithms have an additional evaluation function that evaluates a given function over a set of input ciphertexts. The operations supported by FHE encryption schemes depend on the underlying mathematical structure of the ciphertexts.

Applications based on fully homomorphic encryption use either bit-wise encryption instantiation or integer-wise encryption instantiation to encrypt data, however bit-wise encryption increases the size of data sets. The space required to store the ciphertext of a I-bit integer in bit-wise encryption instantiation is I-ciphertext units whereas integer-wise encryption requires only one ciphertext unit client than bit-wise encryption. Hence the challenge is to bring a balance between space and performance.

Figure 3A:
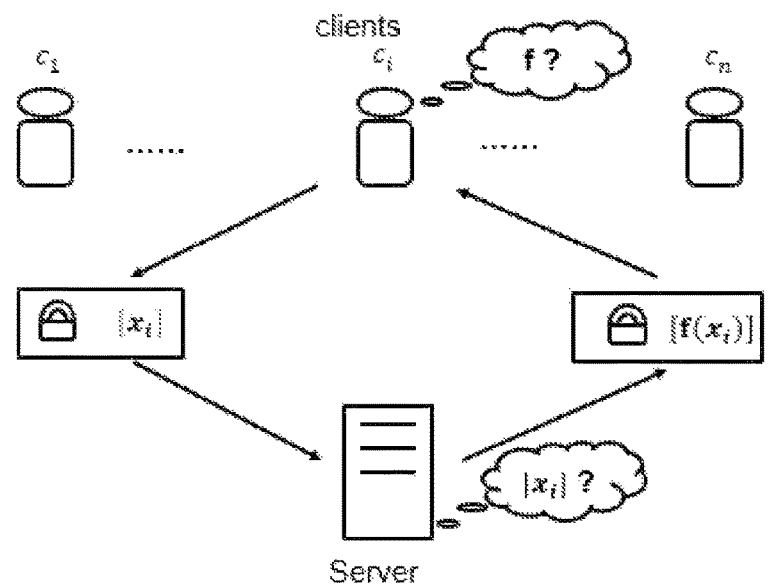
FIG. 3A and FIG. 3B illustrates a use case example block diagram wherein FHE can be applied to machine learning applications in two scenarios that include computation as a service and prediction as a service respectively, according to some embodiments of the present disclosure FIG. 4A
Figure 3B:
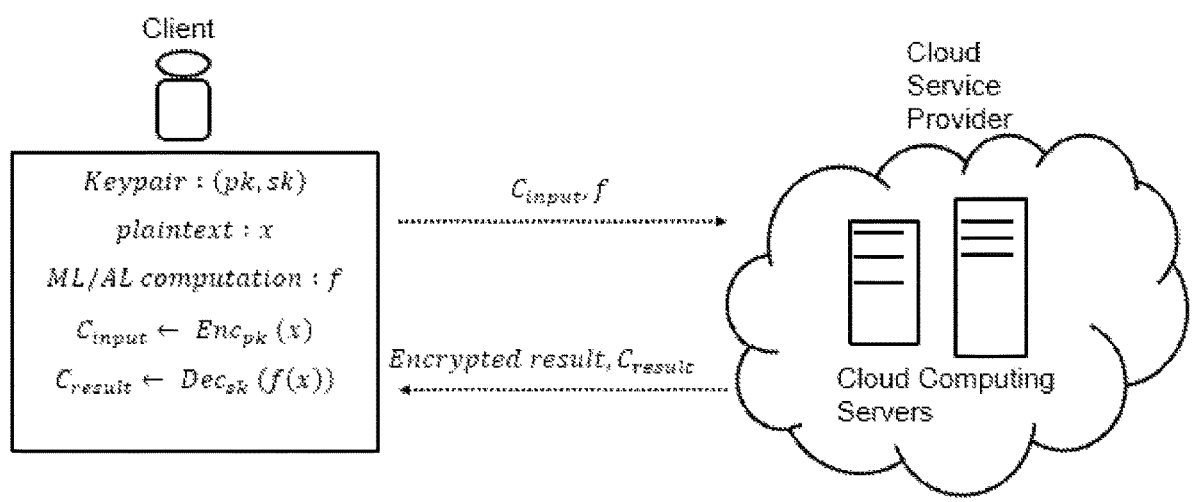

FHE can be applied to machine learning applications in two scenarios: computation as a service and prediction as a service. In computation as a service model, a client requires to outsource ML computations to a cloud service providers (CSP) without revealing any information about the data to it. Here, the client is aware of the ML algorithm that is being outsourced and sends the algorithm and encrypted data to the CSP. The CSP performs the computations on the ciphertexts and sends the encrypted result back to the client. In prediction as a service scenario, the service provider has proprietary machine learning algorithms that they do not wish to share with the client. In the same way, the client doesn't wish to share confidential data to the service provider. Hence, using FHE, the client can provide encrypted inputs to the cloud service provider, who then feeds these encrypted inputs to the proprietary ML algorithm and develop model parameters. The CSP can then use this encrypted model to provide prediction as a service to the client. This way objectives of both client and server are realized. The FIG. 3A and FIG. 3B illustrates a use case block diagram of the two scenarios (FHE can be applied to machine learning applications in two scenarios) computation as a service and prediction as a service, respectively.

Prominent open source implementations of FHE libraries include HElib, SEAL, HEAAN, PALISADE, TFHE and nGraph-HE. Each FHE library has multiple functionality, wherein the FHE functionality comprises a FHE scheme, an optimal configuration for a set of supporting features for the FHE library, a set of FHE parameters and an optimal configuration of the set of FHE parameters, wherein the set of supporting features comprises a packing technique and a noise management technique. The set of supporting features refer to limitation of the FHE library, that must be optimally configured for efficient privacy preserving in the application.

FHE library primarily rely on hardness of three types of hardness assumptions:
Lattice: Lattice schemes rely on hardness of lattice problems like Shortest Vector Problem (SVP) and Closest Vector Problem (CVP).
LWE: LWE schemes rely on hardness of Learning with Errors problem. The problem with these schemes is that the key sizes are much larger.
RLWE: RLWE schemes rely on hardness of Ring LWE problem which is efficient due to the underlying ring structure.

Ring based Learning with Errors (RLWE) is the basis for most of the efficient FHE schemes. In an embodiment, the FHE parameters in RLWE based FHE schemes are shared below;
M—the cyclotomic polynomial
N—degree of cyclotomic polynomial N=Ø(M)
p—modulus for co-efficient in the plaintext
$t=p^r$—plaintext modulus
h—1—norm of the secret key (example: form of vector x is $\Sigma_{i=1}^{n}|x_i|q=q_1*q_2:::q_l$ where l=1 . . . L and L is the number of primes
q is the co-efficient modulus for ciphertext and $q_1$ to $q_l$ are small primes
α—the width of Gaussian distribution for sampling error
X—the error distribution The set of supporting features comprises a packing technique and a noise management technique. Noise management is a major limitation of FHE. Every ciphertext has inherent noise associated which increases with number of computations. There are two ways for noise management, Bootstrapping and Modulus Switching. Bootstrapping is used to reduce the noise and get fresh ciphertext homomorphically at the expense of computation time. Modulus Switching helps in reducing noise but to certain extent only. Further considering noise management in ML, simple ML computations like Matrix multiplication or linear regression are linear in nature since they require only multiplication and addition operations, however, complex ML algorithms like logistic regression, neural networks require computing of exponents which are non-linear in nature and are hence hard to be computed in FHE setting.

From PPML perspective, packing is required to improve the space efficiency and speed up the computation process of ML algorithms. To make the ML algorithms non-interactive, bootstrapping is required, which is expensive. However, to make ML algorithms more efficient and non-interactive, methodologies have to be designed to perform light weight bootstrapping on the packed ciphertexts.

Hence to efficiently enable privacy for ML applications, it is extremely important to choose an optimal FHE and also ensure that the chosen FHE is optimally configured (FHE parameters) for better performance along with minimizing the limitations that include noise management and packing.

Referring now to the drawings, and more particularly to FIG. 1 through FIG. 8B where similar reference characters denote corresponding features consistently throughout the figures, there are shown preferred embodiments and these embodiments are described in the context of the following exemplary system and/or method.

FIG. 1 is a functional block diagram of a system 100 for enabling fully homomorphic encryption (FHE) based privacy in an application in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of system 100 are explained in conjunction with functional overview of the system 100 in FIG. 1 and flow diagram of FIGS. 8A and 8B for enabling privacy in an application using fully homomorphic encryption.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
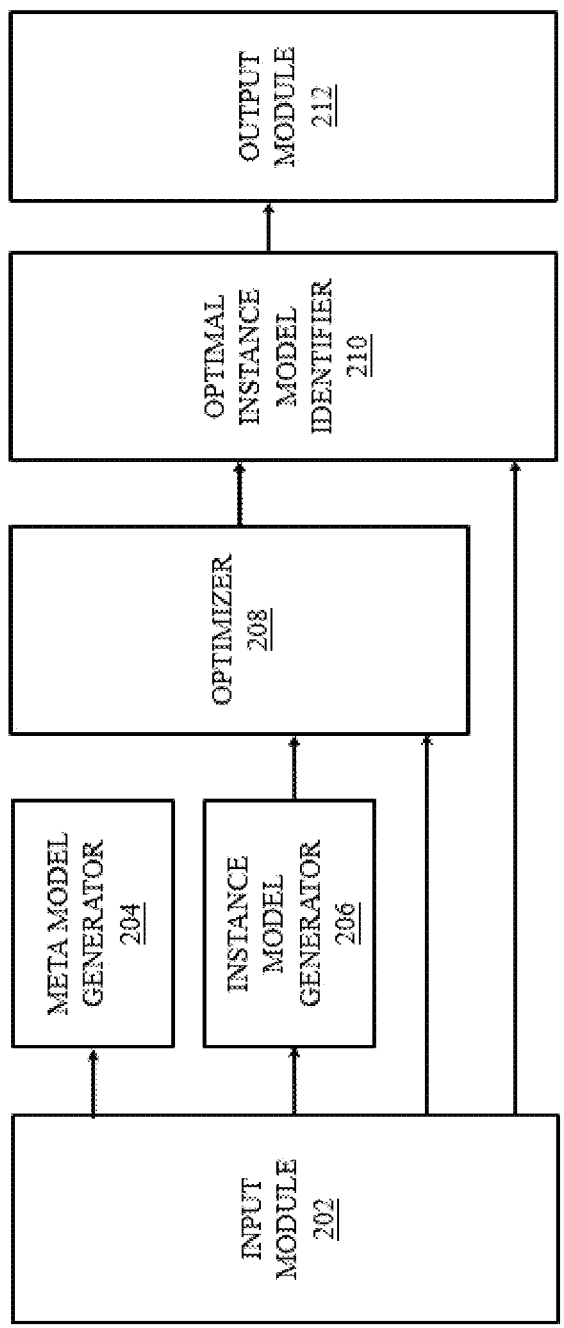
FIG. 2 is a functional block diagram for the system of FIG. 1 according to some embodiments of the present disclosure.

FIG. 2 is a functional block diagram of the system 100 of FIG. 1, in accordance with some embodiments of the present disclosure. As depicted in the architecture, FIG. 2 illustrates the functions of the components of the system 100 that includes enabling privacy in an application using fully homomorphic encryption.

The system 100 for enabling privacy in an application using FHE includes an input module 202 configured for receiving, via a one or more hardware processors, an application, a set of input data pertaining to the application, a set of constraints and a user requirement. The set of input data are indicative of functions performed by the application, the set of constraints are indicative of functional performance and cost of the application, and the user requirement is indicative of an optimization task to be performed as per a user's requirement.

In an embodiment, the application can refer to a machine learning application, wherein privacy preservation is to be enabled in for ML datasets or ML algorithms of the machine learning application.

In an embodiment, the set of constraints includes one of a user-defined constraints and a pre-defined constraints. In an embodiment, the set of constraints comprises a computation time ($\tau_f$), a memory consumption ($m_f$), a communication cost ($comm_f$), a computation cost ($\xi_f$) and a security level ($\lambda$) as shown below;

$$C=\{\tau, m, comm, \xi\}$$

In an embodiment, the set of input data are indicative of functions performed by the application that include matrix multiplication, logistic regression, linear regression, neural networks. A use case of the set of input data is illustrated in the FIG. 4A and FIG. 4B, wherein each node represents a leaf nodes represent the input ciphertexts and intermediate nodes represent a set of operations to be performed in a computation.

In an embodiment, the user requirement is indicative of an optimization task to be performed as per a user's requirement. The set of optimization tasks includes one of a multi objective-multi constraint optimization task and a single objective-multi constraint optimization task. Based on the user requirement, one optimization task from the set of optimization tasks is selected to be implemented for enabling privacy.

According to an embodiment of the disclosure, the system 100 for enabling privacy in an application using FHE further comprises an meta model generator 204 configured for generating, via the one or more hardware processors, a set of inter-connected meta models based on an abstract data type (ADT) technique. The set of meta models comprises a plurality of meta model trees, wherein each of the plurality of meta model trees comprises a plurality of nodes that indicate a fully homomorphic encryption (FHE) library, an associated FHE functionality and an optimal configuration of the associated FHE functionality.

In an embodiment, the abstract data type (ADT) technique comprises of a computation tree technique, JavaScript Object Notation (JSON) parsing, wherein the computation tree technique comprises representation of the application as a set of functions with a plurality of inter-connected nodes forming a tree structure.

In an embodiment, fully homomorphic encryption (FHE) or FHE library enables arbitrary computations on encrypted data from an application without decrypting them. Given a set of ciphertexts corresponding to a set of messages, a function can be computed resulting in an encrypted output, which when decrypted is equal to the result of computation.

In an embodiment, the FHE functionality comprises a FHE scheme, a set of supporting features and a set of FHE parameters and the optimal configuration of the associated FHE functionality comprises of an optimal configuration for the set of supporting features for the FHE and an optimal configuration for the set of FHE parameters.

In an embodiment, the FHE library includes a Homomorphic Encryption library (HElib), a Simple Encrypted Arithmetic Library (SEAL), a Homomorphic Encryption for Arithmetic of Approximate Numbers (HEAAN), PALISADE, Torus Fully Homomorphic Encryption (TFHE) and nGraph-HE. Further the FHE scheme includes brakerski, fan, vercauteren (BGV), Brakerski, Fan (BFE), Cheon, Kim, Kim, Song (CKKS)

In an embodiment, the set of supporting features comprises a packing technique and a noise management technique. Noise management is a major limitation of FHE. Every ciphertext has inherent noise associated which increases with number of computations. There are two ways for noise management, bootstrapping and modulus switching. Bootstrapping is used to reduce the noise and get fresh ciphertext homomorphically at the expense of computation time. Modulus switching helps in reducing noise but to certain extent only. Further considering noise management in ML, simple ML computations like matrix multiplication or linear regression are linear in nature since they require only multiplication and addition operations, however, complex ML algorithms such as logistic regression, neural networks require computing of exponents which are non-linear in nature and are hence hard to be computed in FHE setting. Further the packing is required in order to improve the space efficiency and speed up the computation process of ML algorithms. To make the ML algorithms non-interactive, bootstrapping is required, which is expensive. However, to make ML algorithms more efficient and non-interactive, methodologies have to be designed to perform light weight bootstrapping on the packed ciphertexts.

The set of FHE parameters are selected from an exhaustive set of FHE scheme parameters associated with the FHE library and the FHE schema, wherein the exhaustive set of FHE scheme parameters comprise a cyclotomic polynomial (M), a degree of cyclotomic polynomial (N), a modulus for coefficients in plaintext (p), a plaintext modulus (t), a norm of secret key (h), a width of Gaussian distribution for sampling error (a) and an error distribution (X), which can be expressed as shown below:

$\mathcal{M}$ —the cyclotomic polynomial

N—degree of cyclotomic polynomial N=Ø(M)

p—modulus for co-efficient in the plaintext $t=p^r$—plaintext modulus h—1—norm of the secret key (example:

form of vector x is $\Sigma_{i=1}^n |x_i|$ $q=q_1*q_2:::q_l$ where l=1 . . . L and L is the number of primes q is the co-efficient modulus for ciphertext and $q_1$ to $q_l$ are small primes α—the width of Gaussian distribution for sampling error X—the error distribution The set of FHE parameters and the optimal configuration for the set of FHE parameters is selected from the exhaustive set of FHE scheme parameters based on a circuit depth, a level of accuracy and the set of supporting features wherein the circuit depth and the level of accuracy is determined based on a multiplication operation between a set of nodes in the meta model trees of the meta-models.

In an embodiment, the FIG. 4A and FIG. 4B the circular depth can be expressed as shown below:

$f1=a+b*c$ $f2=a*b*c$

Hence the circular depth for f1 would be 1 and the circular depth for f2 would be 2.

Further for the level of accuracy, multiplication operation for functions such as Sigmoid depend on approximation polynomials as given in Table 1, wherein higher degree polynomials give more accuracy.

TABLE 1

Approximation Polynomials for Sigmoid

| Approximation | Polynomial | Method |
|---|---|---|
| 1 | $0.5 + 0.25x - 0.0208x^3 + 0.00208x^3$ | Taylor series |
| 2 | $0.5 + 0.15x - 0.0015x^3$ | Least square approximation |

Hence the set of inter-connected of meta models that is generated based on ADT techniques comprises a plurality of meta model trees, wherein each of the plurality of meta model trees comprises a plurality of nodes that indicate a fully homomorphic encryption (FHE) library, an associated FHE functionality and an optimal configuration of the associated FHE functionality. Considering the plurality of nodes involved are extremely complex and complicated as they are based on several features as explained above. In an embodiment, the meta models with plurality of nodes is illustrated in FIG. 5A, FIG. 5B and FIG. 5C wherein each node has a pair [a time, a memory] associated with it, wherein the time is represented as milliseconds and the memory represented as in kilobytes (KB). The memory represents a size of ciphertext after encryption (for a leaf node) and a resultant ciphertext after computation (for a intermediate node. Further for each of a leaf node, the time indicates an encryption time and for each of the intermediate nodes the time indicates the computation time. The table below summarizes the computation time and memory per ciphertext required for a given computation using SEAL library (BFV and CKKS) and HEAAN library (CKKS).

TABLE 2

Tabulating constraints for a given computation

| | Without Packing | | |
|---|---|---|---|
| Operation | SEAL (BFV) | HEAAN (CKKS) | SEAL (CKKS) |
| Addition (ms) | 0.019 | 0.26 | 0.06 |
| Multiplication (ms) | 1 | 3.36 | 0.17 |
| a + b*c (ms) | 1.619 | 7.2 | 0.83 |
| Memory per ciphertext (KB) | 2 | 26 | 4 |

According to an embodiment of the disclosure, the system 100 for enabling privacy in an application using FHE further comprises an instance model generator 206 configured for generating, via the one or more hardware processors, a set of instance models for the application based on the set of constraints using the set of inter-connected meta models. Each of the set of instance models comprises a fully homomorphic encryption (FHE) technique, the associated FHE functionality and the optimal configuration of the associated FHE functionality identified from the meta models based on the set of constraints.

The set of instance models for the application based on the set of constraints uses the set of inter-connected meta models. In an embodiment, considering a use case example wherein the set of constraints can be defined as follow:

Constraint 1=time<2 ms

Constraint 2=memory<10 KB

Figure 4A:
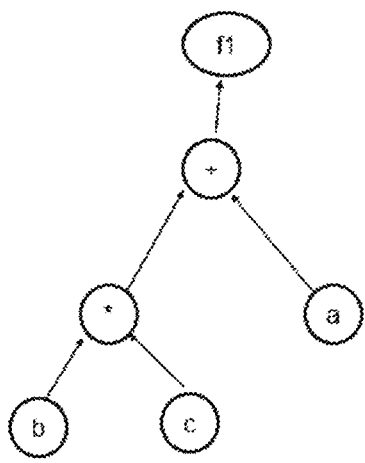
FIG. 4B illustrates a use case of the set of input data to the system for enabling privacy in an application using fully homomorphic encryption (FHE), according to some embodiments of the present disclosure.
Figure 4B:
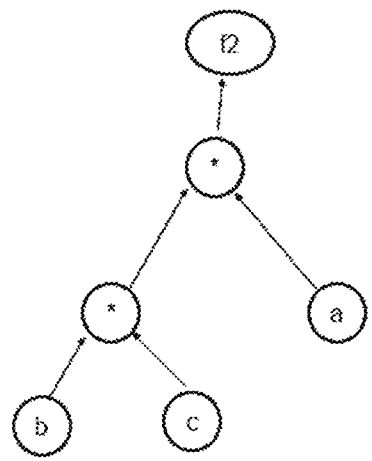
Figures 6A, 6B:
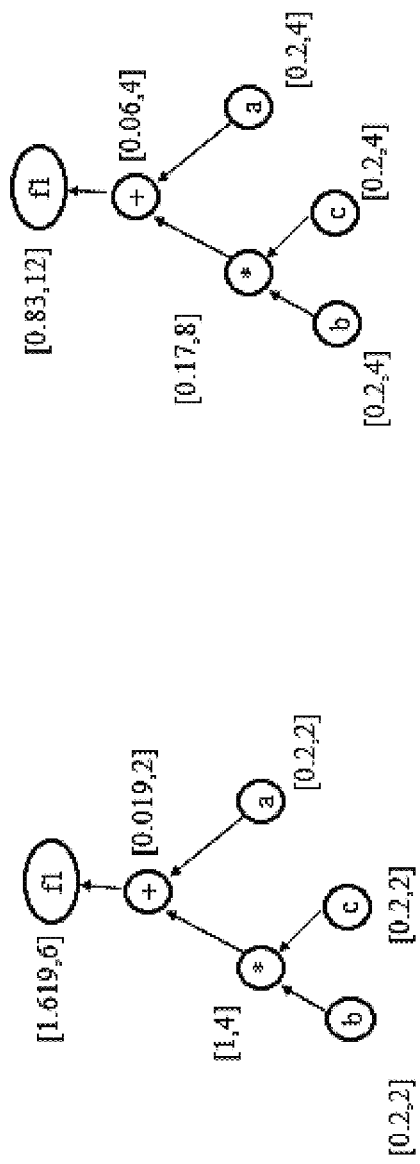
FIG. 6B illustrates a use case of a set of instance models with plurality of nodes generated using the set of input data and the set of meta models, according to some embodiments of the present disclosure

Based on the given constraints and the meta models (as shared in FIG. 4A, FIG. 4B and FIG. 4C), the set of instance models with plurality of nodes generated based on the set of constraints is illustrated in FIG. 6A and FIG. 6B wherein based on the time and memory constraints defined, the metamodels of FIG. 4A and FIG. 4C only are used for generating the instance models.

According to an embodiment of the disclosure, the system 100 for enabling privacy in an application using FHE further comprises an optimizer 208 configured for optimizing, via the one or more hardware processors, each of the set of instance models by an optimization task to obtain a decision for each of the set of constraints. The optimization task is identified from a set of optimization tasks based on the user requirement and the set of optimization tasks comprises a multi objective-multi constraint optimization task and a single objective-multi constraint optimization task.

In an embodiment, the user requirement is indicative of an optimization task to be performed as per a user's requirement. The set of optimization tasks comprise the multi objective-multi constraint optimization task and the single objective-multi constraint optimization task, wherein one optimization task is identified from the set of optimization tasks to be implemented for enabling privacy preservation based on the user requirement.

In an embodiment, the multi objective-multi constraint optimization task optimizes the set of constraints that include minimize computation time $\tau$, memory consumption m, communication cost comm and computation cost of a function F in a privacy preserving manner and is represented as follows:

$$\mathcal{F}^*_{c_\dagger} = \mathrm{argmin}\left\{\mathcal{F}_j^{c_\dagger} \mid \mathcal{F}_j^{c_\dagger} = \mathrm{argmin}\left\{F_{jk}^{c_\dagger} \mid \lambda_j > \lambda\right\}_{k \varepsilon S_{l_j}}, l_j \varepsilon \mathcal{L}\right\} \text{ where}$$

$$c_\dagger \in C$$

such that $$\mathcal{F}_{jk}^{c_\dagger} = \sum_{i=1}^{|\mathcal{F}|} \mathcal{F}_{ijk}^{c_\dagger} x_{ijk} \leq c_{\dagger f}, \sum_{k=1}^{|\mathcal{F}|} x_{ijk} = |\mathcal{F}|$$

where,
set of constraints is represented by C={$\tau$, m, comm, $\xi$}, $\tau_f$ is the computation time, $m_f$ is the memory consumption, $comm_f$ is the communication cost, $\xi_f$ is the computation cost and $\lambda$ is the security level,
$\mathcal{F}$ is optimal instance model,
F={$f_1, f_2, f_3, \ldots, f_n$}: Set of sub-computations,
$F_{jk}$: Instance model generated using $j^{th}$ FHE library and FHE scheme
$F^*_{jk}$: Instance model generated using $j^{th}$ FHE library and FHE scheme
$\mathcal{F}_{jk}^{c_\dagger}$: Optimal instance model based on constraint $c_\dagger \in C$
$\mathcal{F}_j^{c_\dagger}$: Optimal constraint for instance model F model using FHE library $l_j$, where $c_\dagger \in C$
$p_q$: Number of schemes supported by library l
$\lambda_j$: Security level for FHE library j
$\alpha$: Number of FHE libraries
$\mathcal{L}=\{l_1 \ldots l_\alpha\}$: set of FHE libraries available
$|\mathcal{F}|$: Number of sub-functions
$f_i \in F$: $i^{th}$ sub computations of F
$\mathcal{F}_{ijk}^{c_\dagger}$: Constraint to compute $f_i$ using library $l_j$ and FHE scheme $S_{l_{jk}}$, where $c_\dagger \in C$
$W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}$$

In an embodiment, the single objective-multi constraint optimization task comprises:

$$\mathcal{F}^* = \mathrm{argmin}\left\{F_j \mid F_j = \mathrm{argmin}\{F_{jk} \mid \lambda_j > \lambda\}_{k \varepsilon S_{l_j}}, l_j \varepsilon \mathcal{L}\right\},$$

$$F_{jk} = \sum_{i=1}^{|\mathcal{F}|} \mathcal{F}_{ijk}^{c_\dagger} x_{ijk}$$

such that $$F_{jk} = W_\tau * f_{ijk}^\tau + W_m * f_{ijk}^m + W_{comm} * f_{ijk}^{comm} + W_\xi * f_{ijk}^\xi,$$

where $W_\tau + W_m + W_{comm} + W_\xi = 1$ and $$\Sigma_{i=1}^{|\mathcal{F}|} \mathcal{F}_{ijk}^{c_\dagger} x_{ijk} \leq c_{\dagger f} \Sigma_{k=1}^{|\mathcal{F}|} x_{ijk} = |\mathcal{F}|$$

where
set of constraints is represented by C={$\tau$, m, comm, $\xi$}, $\tau_f$ is the computation time, $m_f$ is the memory consumption, $comm_f$ is the communication cost, $\xi_f$ is the computation cost and $\lambda$ is the security level,
$\mathcal{F}$ is optimal instance model,
F={$f_1, f_2, f_3, \ldots, f_n$}: Set of sub-computations,
$F_{jk}$: Instance model generated using $j^{th}$ FHE library and FHE scheme
$F^*_{jk}$: Instance model generated using $j^{th}$ FHE library and FHE scheme
$\mathcal{F}_{jk}^{c_\dagger}$: Optimal instance model based on constraint $c_\dagger \in C$
$\mathcal{F}_j^{c_\dagger}$: Optimal constraint for instance model F model using FHE library $l_j$, where $c_\dagger \in C$
$p_q$: Number of schemes supported by library l
$\lambda_j$: Security level for FHE library j
$\alpha$: Number of FHE libraries
$\mathcal{L}=\{l_1 \ldots l_\alpha\}$: set of FHE libraries available
$|\mathcal{F}|$: Number of sub-functions
$f_i \in F$: $i^{th}$ sub computations of F
$\mathcal{F}_{ijk}^{c_\dagger}$: Constraint to compute $f_i$ using library $l_j$ and FHE scheme $S_{l_{jk}}$, where $c_\dagger \in C$
$W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}$$

According to an embodiment of the disclosure, the system 100 for enabling privacy in an application using FHE further comprises an optimal instance model identifier 210 configured for identifying, via the one or more hardware processors, a pre-defined number of optimal instance models from the set of instance models using a ranking technique. The ranking technique is performed based on the set of constraints.

In an embodiment, the ranking techniques includes, but are not limited to, weighted sum model, aggregated indices randomization and Technique for Order of Preference by Similarity to Ideal Solution (TOPSIS). In an embodiment, the ranking technique is performed based on set of constraints, wherein the user can prioritize among the set of constraints and the ranking process for the set of instance models is performed accordingly.

In an embodiment, the pre-defined number of optimal instance models is decided based on a user's requirement, wherein the user can choose how many optimal instance models the user may want to be displayed for a final selection of the privacy preserving technique to be used. In a use case scenario, if the user wishes to see top 3 optimal instance models, then the top three optimal instance models from the ranked list is displayed for the user.

Figure 7:
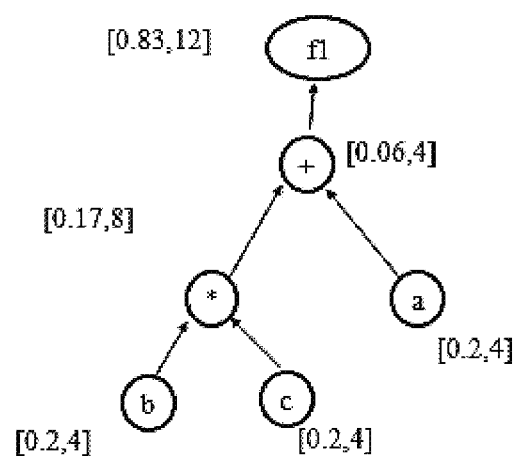
FIG. 7 illustrates a use case of an optimal instance model with plurality of nodes generated using the set of instance models, according to some embodiments of the present disclosure FIG. 8A

In an embodiment, the pre-defined number of optimal instance models identified from the set of instance models is illustrated in FIG. 7 wherein an optimal instance model is selected from the instance models (of FIG. 6A and FIG. 6B) based on the set of constraints and the user's requirement.

According to an embodiment of the disclosure, the system 100 for enabling privacy in an application using FHE further comprises an output module 212 configured for displaying, via the one or more hardware processors, the optimal instance model. The optimal instance model is indicative of the privacy preservation using FHE to be enabled in the application based on the fully homomorphic encryption (FHE) library, the associated FHE functionality and the optimal configuration of the associated FHE functionality in the optimal instance model The various modules of the system 100 for enabling privacy in an application using fully homomorphic encryption are implemented as at least one of a logically self-contained part of a software program, a self-contained hardware component, and/or, a self-contained hardware component with a logically self-contained part of a software program embedded into each of the hardware component that when executed perform the above method described herein.

Figure 8A:
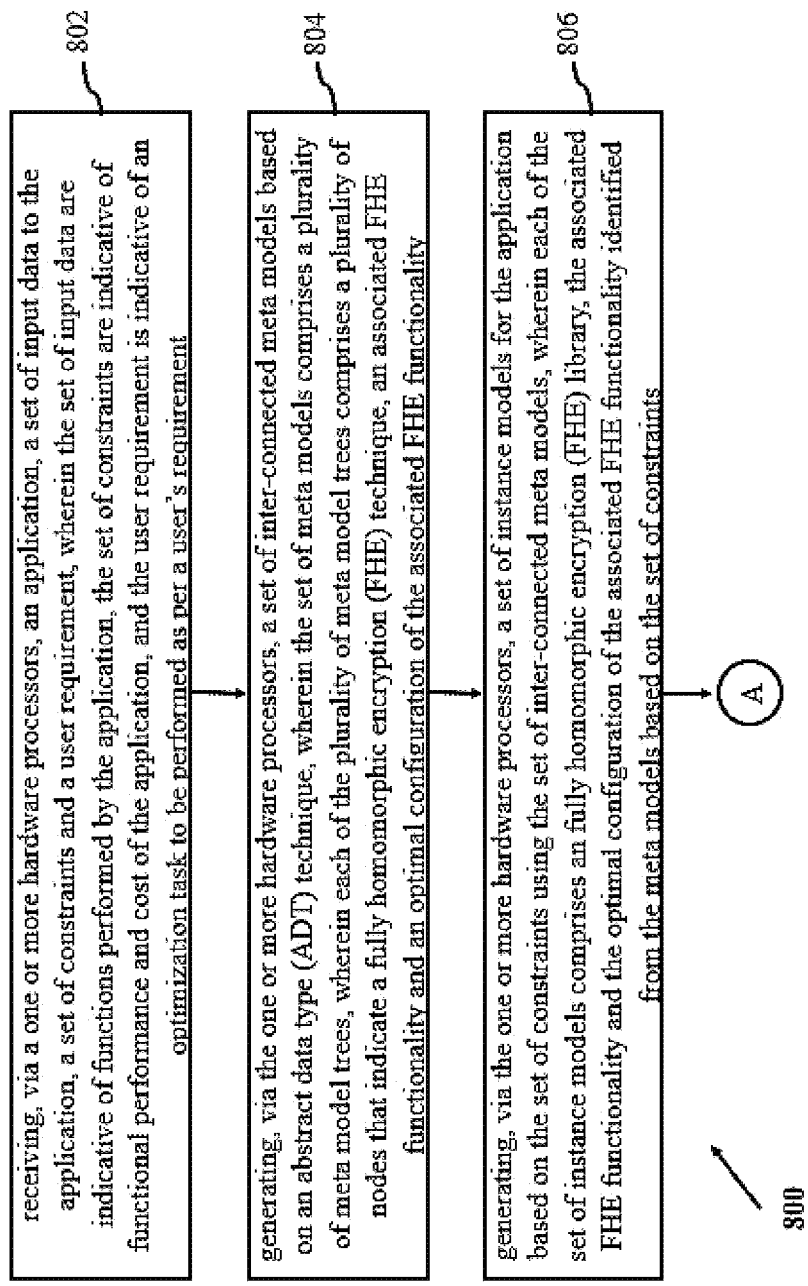
FIG. 8B is a flow diagram illustrating a method for enabling privacy in an application using fully homomorphic encryption, in accordance with some embodiments of the present disclosure.
Figure 8B:
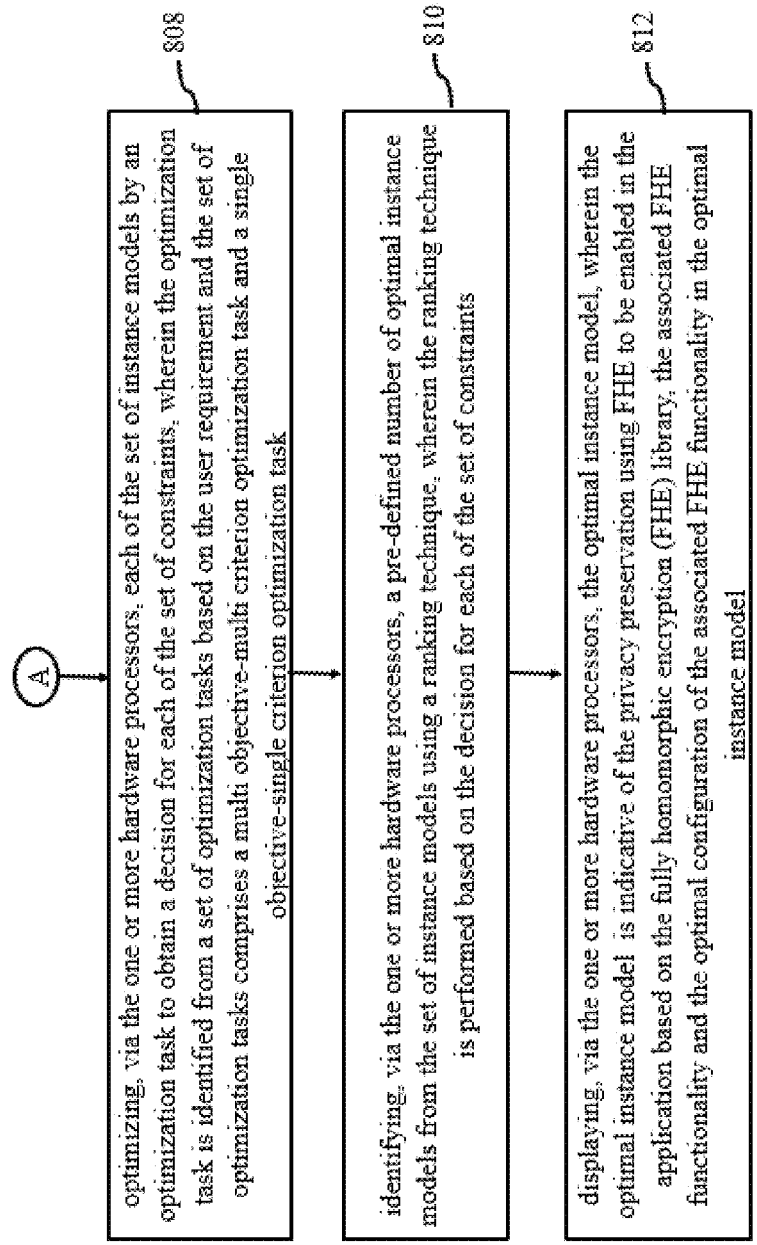

Functions of the components of the system 100 are explained in conjunction with functional modules of the system 100 stored in the memory 102 and further explained in conjunction with flow diagram of FIGS. 8A and 8B. The FIG. 8A and FIG. 8B, with reference to FIG. 1, is an exemplary flow diagram illustrating a method (800) for using the system 100 of FIG. 1 according to an embodiment of the present disclosure.

The steps of the method of the present disclosure will now be explained with reference to the components of the system(100) for enabling fully homomorphic encryption (FHE) based privacy preservation in an application and the modules (202-212) as depicted in FIG. 2 and the flow diagrams as depicted in FIG. 8A and FIG. 8B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 802 of the method (800), the one or more hardware processors are configured receiving, in the input module 202, an application, a set of input data to the application, a set of constraints and a user requirement, wherein the set of input data are indicative of functions performed by the application, the set of constraints are indicative of functional performance and cost of the application, and the user requirement is indicative of an optimization task to be performed as per a user's requirement.

In an embodiment, the application can refer to a machine learning application, wherein privacy preservation is to be enabled in for ML datasets or ML algorithms of the machine learning application.

In an embodiment, the set of constraints comprises of either a user-defined constraint or a pre-defined constraint. The set of constraints comprises a a computation time ($\tau_f$), a memory consumption ($m_f$), a communication cost (comm$_f$), a computation cost ($\xi_f$) and a security level ($\lambda$).

In an embodiment, the set of input data are indicative of functions performed by the application that includes matrix multiplication, logistic regression, linear regression, neural networks.

In an embodiment, the user requirement is indicative of an optimization task to be performed as per a user's requirement. The set of optimization tasks comprise a multi objective-multi constraint optimization task and a single objective-multi constraint optimization task. Based on the user requirement one optimization task from the set of optimization tasks is selected to be implemented for enabling privacy preservation.

At step 804 of the method (800), the one or more hardware processors are configured for generating a set of inter-connected meta models based on an abstract data type (ADT) technique in the meta model generator 204. The set of meta models comprises a plurality of meta model trees, wherein each of the plurality of meta model trees comprises a plurality of nodes that indicate a fully homomorphic encryption (FHE) library, an associated FHE functionality and an optimal configuration of the associated FHE functionality.

In an embodiment, in an embodiment, the abstract data type (ADT) technique comprises of a computation tree technique, JSON parsing, wherein the computation tree technique comprises representation of the application as a set of functions with a plurality of inter-connected nodes forming a tree structure At step 806 of the method (800), the one or more hardware processors are configured for generating a set of instance models for the application based on the set of constraints using the set of inter-connected meta models in the instance model generator 206. Each of the set of instance models comprises a fully homomorphic encryption (FHE) library, the associated FHE functionality and the optimal configuration of the associated FHE functionality identified from the meta models based on the set of constraints.

At step 808 of the method (800), the one or more hardware processors are configured for optimizing each of the set of instance models by an optimization task to obtain a decision for each of the set of constraints in the optimizer 208. The optimization task is identified from a set of optimization tasks based on the user requirement and the set of optimization tasks comprises a multi objective-multi constraint optimization task and a single objective-multi constraint optimization task.

In an embodiment, the user requirement is indicative of an optimization task to be performed as per a user's requirement. The set of optimization tasks comprise the multi objective-multi constraint optimization task and the single objective-multi constraint optimization task, wherein one optimization task is identified from the set of optimization tasks to be implemented for enabling privacy preservation based on the user requirement.

In an embodiment, the multi objective-multi constraint optimization task optimizes the set of constraints that include minimize computation time τ, memory consumption m, communication cost comm and computation cost of a function F in a privacy preserving manner and is represented as follows:

$$\mathcal{F}^*_{c_\dagger} = \operatorname{argmin}\left\{\mathcal{F}_j^{c_\dagger} \mid \mathcal{F}_j^{c_\dagger} = \operatorname{argmin}\left\{\{\mathcal{F}_{jk}^{c_\dagger} \mid \lambda_j > \lambda\}_{k \in S_{l_j}}, l_j \varepsilon \mathcal{L}\right\}\right\} \text{ where}$$

$$c_\dagger \in C$$

such that $$\mathcal{F}_{jk}^{c_\dagger} = \sum_{i=1}^{|\mathcal{F}|} \mathcal{F}_{ijk}^{c_\dagger} x_{ijk} \le c_{\dagger f}, \sum_{k=1}^{|\mathcal{F}|} x_{ijk} = |\mathcal{F}|$$

where, set of constraints is represented by C={τ, m, comm, ξ}, $\tau_f$ is the computation time, $m_f$ is the memory consumption, $comm_f$ is the communication cost, $\xi_f$ is the computation cost and λ is the security level,
$\mathcal{F}$ is optimal instance model,
F={$f_1$, $f_2$, $f_3$, . . . , $f_n$}: Set of sub-computations,
$F_{jk}$: Instance model generated using $j^{th}$ FHE library and FHE scheme
$F^*_{jk}$: Instance model generated using $j^{th}$ FHE library and FHE scheme
$\mathcal{F}_{jk}^{c_\dagger}$: Optimal instance model based on constraint $c_\dagger \in C$
$\mathcal{F}_j^{c_\dagger}$: Optimal constraint for instance model F model using FHE library $l_j$, where $c_\dagger \in C$
$p_q$: Number of schemes supported by library l
$\lambda_j$: Security level for FHE library j
α: Number of FHE libraries
$\mathcal{L}$={$l_1$ . . . $l_\alpha$}: set of FHE libraries available
|$\mathcal{F}$|: Number of sub-functions
$f_i \in F$: $i^{th}$ sub computations of F
$\mathcal{F}_{ijk}^{c_\dagger}$: Constraint to compute $f_i$ using library $l_j$ and FHE scheme $S_{l_{jk}}$, where $c_\dagger \in C$
$W_{c_\dagger}$: User given priority for constraint computation time where time τ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}$$

In an embodiment, the single objective-multi constraint optimization task comprises:

$$\mathcal{F}^* = \operatorname{argmin}\left\{F_j \mid F_j = \operatorname{argmin}\{F_{jk} \mid \lambda_j > \lambda\}_{k \in S_{l_j}}, l_j \varepsilon \mathcal{L}\right\},$$

$$F_{jk} = \sum_{i=1}^{|\mathcal{F}|} \mathcal{F}_{ijk}^{c_\dagger} x_{ijk}$$

such that $$F_{jk} = \mathcal{W}_\tau * f_{ijk}^\tau + \mathcal{W}_m * f_{ijk}^m + \mathcal{W}_{comm} * f_{ijk}^{comm} + \mathcal{W}_\xi * f_{ijk}^\xi,$$

where $\mathcal{W}_\tau + \mathcal{W}_m + \mathcal{W}_{comm} + \mathcal{W}_\xi = 1$ and $$\Sigma_{i=1}^{|\mathcal{F}|} \mathcal{F}_{ijk}^{c_\dagger} x_{ijk} \le c_{\dagger f}, \Sigma_{k=1}^{|\mathcal{F}|} x_{ijk} = |\mathcal{F}|$$

where set of constraints is represented by C={τ, m, comm, ξ}, $\tau_f$ is the computation time, $m_f$ is the memory consumption, $comm_f$ is the communication cost, $\xi_f$ is the computation cost and λ is the security level,
$\mathcal{F}$ is optimal instance model,
F={$f_1$, $f_2$, $f_3$, . . . , $f_n$}: Set of sub-computations,
$F_{jk}$: Instance model generated using $j^{th}$ FHE library and FHE scheme
$F^*_{jk}$: Instance model generated using $j^{th}$ FHE library and FHE scheme
$\mathcal{F}_{jk}^{c_\dagger}$: Optimal instance model based on constraint $c_\dagger \in C$
$\mathcal{F}_j^{c_\dagger}$: Optimal constraint for instance model F model using FHE library $l_j$, where $c_\dagger \in C$
$p_q$: Number of schemes supported by library l
$\lambda_j$: Security level for FHE library j
α: Number of FHE libraries
$\mathcal{L}$={$l_1$ . . . $l_\alpha$}: set of FHE libraries available
|$\mathcal{F}$|: Number of sub-functions
$f_i \in F$: $i^{th}$ sub computations of F
$\mathcal{F}_{ijk}^{c_\dagger}$: Constraint to compute $f_i$ using library $l_j$ and FHE scheme $S_{l_{jk}}$, where $c_\dagger \in C$
$W_{c_\dagger}$: User given priority for constraint computation time where time τ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}$$

At step 810 of the method (800), the one or more hardware processors are configured for identifying a predefined number of optimal instance models from the set of instance models using a ranking technique in the optimal instance model identifier 210. The ranking technique is performed based on the decision for each of the set of constraints In an embodiment, the ranking techniques includes weighted sum model and aggregated indices randomization. The ranking technique is performed based on set of constraints, wherein the user can prioritize among the set of constraints and the ranking process for the set of instance models is performed accordingly.

At step 812 of the method (800), the one or more hardware processors are configured for displaying the optimal instance model in the comprises an output module 212. The optimal instance model is indicative of the privacy preservation using FHE to be enabled in the application based on the fully homomorphic encryption (FHE) library, the associated FHE functionality and the optimal configuration of the associated FHE functionality in the optimal instance model The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Experimental Results

The experiment has been conducted using the single objective-multi constraint optimization task optimization problem using a TOPSIS optimizer. Two sets of inputs are given to optimization solver (TOPSIS), set-I is Columns (2,3&4) and set-II is Columns (5 to 10). Set-I give estimates of each of the operations based on the computation of basic primitive operations. Using this the optimizer gave SEAL library as the optimal solution for matrix multiplication. For set-II, if time and memory consumption are given same weightage by the user, the optimizer gives SEAL-2 as the optimal solution, with HEAAN 2 as the second preference and SEAL as third. However, if memory is given higher weightage, then optimizer returns HEAAN-2 as the optimal solution, SEAL-2 and SEAL as second and third preference respectively. The same has been documented in the table 4 below;

TABLE 4

Experiment using TOPSIS 1

| | Calculated estimates | | | Practical w/o packing | | | Practical with packing | |
|---|---|---|---|---|---|---|---|---|
| Operation | HElib | SEAL | HEAAN | HElib | SEAL | HEAAN | SEAL2 | HEAAN2 |
| Add + Mul (millisecs) | 16 | 13.5 | 28.9 | 16 | 13.5 | 28.9 | 30 | 283 |
| 100 × 100 Matrix mult on 32 cores (secs) | 330 | 200 | 1100 | 680 | 278 | 745 | 11.7 | 22.5 |
| Memory per ciphertext (KB) | 443 | 16 | 106 | 443 | 16 | 106 | 262144 | 1048 |
| Memory for 100 × 100 matrix mult (GB) | 4.4 | 0.16 | 1.06 | 11.4* | 3.78* | 17.78* | 0.8* | 0.14* |
| Rank-Time and Mem equal weight | 2 | 1 | 3 | 4 | 3 | 5 | 1 | 2 |
| Rank-Mem more weight than time | 3 | 1 | 2 | 4 | 3 | 5 | 2 | 1 |

Further the experimentation was conducted with two more sets of inputs to the recommendation system optimization solver (TOPSIS), set-I Columns (2&3g) and set-II Columns (4&5). The optimizer gives HEAAN as the best solution for both the sets as shown below in table 5 below:

TABLE 5

Experiment using TOPSIS 2

| | Calculated estimates | | Practical | |
|---|---|---|---|---|
| Operation | SEAL | HEAAN | SEAL | HEAAN |
| Add (millisecs) | 2 | 0.88 | 2 | 0.88 |
| Mul (millisecs) | 62.8 | 470 | 62.8 | 470 |
| Time—Linear Regression—150 × 4 dataset (secs) | 2 | 1.8 | 10 | 7.7 |
| Memory per ciphertext (KB) | 64 | 524 | 64 | 524 |
| Memory for LR(MB) | 151 | 0.01 | 921 * | 0.469 * |
| Rank | 2 | 1 | 2 | 1 |

The embodiments of present disclosure herein address the problem of enabling privacy in an application using fully homomorphic encryption. The disclosure more specifically refers to enabling a most optimal FHE for enabling privacy for an application based on a set of constraints using a disclosed set of optimization tasks. The set of optimization tasks comprise a multi objective-multi constraint optimization task and a single objective-multi constraint optimization task, that identifies an optimal FHE library, along with an associated FHE functionality and optimal configuration of the associated FHE functionality based on the set of constraints. The identified FHE along with the associated FHE functionality and the optimal configuration of the associated FHE functionality facilitate optimal implementation of privacy in applications.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for enabling privacy in an application using fully homomorphic encryption (FHE), the method comprising:

receiving, via a one or more hardware processors, the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement;

generating, via the one or more hardware processors, a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality;

generating, via the one or more hardware processors, a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints;

optimizing, via the one or more hardware processors, each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task;

identifying, via the one or more hardware processors, a pre-defined number of optimal instance models from the set of instance models using a ranking technique, wherein the ranking technique is performed based the set of constraints; and displaying, via the one or more hardware processors, an optimal instance model, wherein the optimal instance model is indicative of the privacy preservation using FHE to be enabled in the application.

2. The method according to claim 1, wherein the set of constraints comprises one of a user-defined constraints or a pre-defined constraints, where the set of constraints comprises a computation type, a computation time, a memory consumption, a communication cost, a computation cost and a security level.

3. The method of claim 1, wherein the ADT technique comprises of a computation tree technique, JavaScript Object Notation (JSON™) parsing, wherein the computation tree technique comprises representation of the application as a set of functions with a plurality of inter-connected nodes forming a tree structure.

4. The method of claim 1, wherein the FHE functionality comprises a FHE scheme, a set of supporting features and a set of FHE parameters and the optimal configuration of the associated FHE functionality comprises of an optimal configuration for the set of supporting features for the FHE and an optimal configuration for the set of FHE parameters.

5. The method of claim 4, wherein the set of supporting features comprises a packing technique and a noise management technique.

6. The method of claim 4, wherein the set of FHE parameters are selected from a set of FHE scheme parameters associated with the FHE library and the FHE schema, wherein the set of FHE scheme parameters comprises a cyclotomic polynomial, a degree of cyclotomic polynomial, a modulus for coefficients in plaintext, a plaintext modulus, a norm of secret key, a width of Gaussian distribution for sampling error and an error distribution.

7. The method of claim 6, wherein the set of FHE parameters and the optimal configuration for the set of FHE parameters are selected from the set of FHE scheme parameters based on a circuit depth, a level of accuracy and the set of supporting features wherein the circuit depth and the level of accuracy are determined based on a multiplication operation between a set of nodes in the meta model tree of the meta-models.

8. The method of claim 1, wherein the multi objective-multi constraint optimization task optimizes the set of constraints that comprises a minimize computation time $\tau$, a memory consumption m, a communication cost comm and a computation cost of a function F in a privacy preserving manner and is represented as follows:

$$\mathcal{F}^*_{c_\dagger} = \operatorname{argmin}\left\{\mathcal{F}^{c_\dagger}_j \mid \mathcal{F}^{c_\dagger}_j = \operatorname{argmin}\left\{\{\mathcal{F}^{c_\dagger}_{jk} \mid \lambda_j > \lambda\}_{k \in S_{l_j}}, l_j \in \mathcal{L}\right\}\right\} \text{ where}$$

$$c_\dagger \in C$$

such that $$\mathcal{F}^{c_\dagger}_{jk} = \sum_{i=1}^{|\mathcal{F}|} \mathcal{F}^{c_\dagger}_{ijk} x_{ijk} \le c_{\dagger f}, \sum_{k=1}^{|\mathcal{F}|} x_{ijk} = |\mathcal{F}|$$

where, set of constraints is represented by C={$\tau$, m, comm, $\xi$}, $\tau_f$ is the computation time, $m_f$ is the memory consumption, $comm_f$ is the communication cost, $\xi_f$ is the computation cost and is the security level, $\mathcal{F}$ is optimal instance model, F={$f_1, f_2, f_3, \ldots, f_n$}: Set of sub-computations, $F_{jk}$: Instance model generated using $j^{th}$ FHE library and FHE scheme $F^*_{jk}$: Instance model generated using $j^{th}$ FHE library and FHE scheme $\mathcal{F}_{jk}^{c\dagger}$: Optimal instance model based on constraint $c_\dagger \in C$ $\mathcal{F}_{j}^{c\dagger}$: Optimal constraint for instance model F model using FHE library $l_j$, where $c_\dagger \in C$ $p_q$: Number of schemes supported by library l $\lambda_j$: Security level for FHE library j $\alpha$: Number of FHE libraries $\mathcal{L} = \{l_1 \ldots l_\alpha\}$: set of FHE libraries available $|\mathcal{F}|$: Number of sub-functions $f_i \in F$: $i^{th}$ sub computations of F $\mathcal{F}_{ijk}^{c\dagger}$: Constraint to compute $f_i$ using library $l_j$ and FHE scheme $S_{l_{jk}}$, where $c_\dagger \in C$ $W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and } FHE \text{ scheme } S_{l_{jk}} \\ 0 & \text{otherwise} \end{cases}$$

9. The method of claim 1, wherein the single objective-multi constraint optimization task comprises:

$$\mathcal{F}^* = \operatorname{argmin}\left\{F_j \mid F_j = \operatorname{argmin}\{F_{jk} \mid \lambda_j > \lambda\}_{k \in S_{l_j}}, l_j \varepsilon \mathcal{L}\right\},$$

$$F_{jk} = \sum_{i=1}^{|\mathcal{F}|} \mathcal{F}_{ijk}^{c\dagger} x_{ijk}$$

such that $$F_{jk} = W_\tau * f_{ijk}^\tau + W_m * f_{ijk}^m + W_{comm} * f_{ijk}^{comm} + W_\xi * f_{ijk}^\xi,$$

where $W_\tau + W_m + W_{comm} + W_\xi = 1$ and $$\Sigma_{i=1}^{|\mathcal{F}|} |\mathcal{F}_{ijk}^{c\dagger}| x_{ijk} \le c_\dagger, \Sigma_{k=1}^{|\mathcal{F}|} |x_{ijk}| = |\mathcal{F}|$$

where set of constraints is represented by $C = \{\tau, m, comm, \xi\}$, $\tau_f$ is the computation time, $m_f$ is the memory consumption, $comm_f$ is the communication cost, $\xi_f$ is the computation cost and $\lambda$ is the security level, $\mathcal{F}$ is optimal instance model, $F = \{f_1, f_2, f_3, \ldots, f_n\}$: Set of sub-computations, $F_{jk}$: Instance model generated using $j^{th}$ FHE library and FHE scheme $F^*_{jk}$: Instance model generated using $j^{th}$ FHE library and FHE scheme $\mathcal{F}_{jk}^{c\dagger}$: Optimal instance model based on constraint $c_\dagger \in C$ $\mathcal{F}_{j}^{c\dagger}$: Optimal constraint for instance model F model using FHE library $l_j$, where $c_\dagger \in C$ $p_q$: Number of schemes supported by library l $\lambda_j$: Security level for FHE library j $\alpha$: Number of FHE libraries $\mathcal{L} = \{l_1 \ldots l_\alpha\}$: set of FHE libraries available $|\mathcal{F}|$: Number of sub-functions $f_i \in F$: $i^{th}$ sub computations of F $\mathcal{F}_{ijk}^{c\dagger}$: Constraint to compute $f_i$ using library $l_j$ and FHE scheme $S_{l_{jk}}$, where $c_\dagger \in C$ $W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and } FHE \text{ scheme } S_{l_{jk}} \\ 0 & \text{otherwise} \end{cases}$$

10. A system for enabling privacy in an application using fully homomorphic encryption (FHE), comprising:
one or more memories;
one or more hardware processors;
an input/output interface; and
the one or more memories coupled to the one or more hardware processors, wherein the one or more hardware processors are configured to execute programmed instructions stored in the one or more memories to:
receive the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement;
generate, a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality;
generate a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints;
optimize each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task;
identify a pre-defined number of optimal instance models from the set of instance models using a ranking technique, wherein the ranking technique is performed based the set of constraints; and
display an optimal instance model, wherein the optimal instance model is indicative of the privacy preservation using FHE to be enabled in the application.

11. The system of claim 10, wherein the abstract data type (ADT) technique are implemented by the one or more hardware processors that are further configured by the instructions to represent the input application as a set of functions with a plurality of inter-connected nodes forming a tree structure based on a the computation tree technique.

12. The system of claim 10, wherein the multi objective-multi constraint optimization task are implemented by the one or more hardware processors that are further configured by the instructions to perform optimization task using the multi objective-multi constraint optimization task as shown below:

$$\mathcal{F}_{c_\dagger}^* = \operatorname{argmin}\left\{\mathcal{F}_j^{c\dagger} \mid \mathcal{F}_j^{c\dagger} = \operatorname{argmin}\left\{\{\mathcal{F}_{jk}^{c\dagger} \mid \lambda_j > \lambda\}_{k \in S_{l_j}}, l_j \varepsilon \mathcal{L}\right\}\right\} \text{ where}$$

$$c_\dagger \in C$$

such that $$\mathcal{F}_{jk}^{c\dagger} = \sum_{i=1}^{|\mathcal{F}|} \mathcal{F}_{ijk}^{c\dagger} x_{ijk} \leq c_{\dagger f}, \sum_{k=1}^{|\mathcal{F}|} x_{ijk} = |\mathcal{F}|$$

where,
set of constraints is represented by C={$\tau$, m, comm, $\xi$}, $\tau_f$ is the computation time, $m_f$ is the memory consumption, $comm_f$ is the communication cost, $\xi_f$ is the computation cost and $\lambda$ is the security level,
$\mathcal{F}$ is optimal instance model,
F={$f_1, f_2, f_3, \ldots, f_n$}: Set of sub-computations,
$F_{jk}$: Instance model generated using $j^{th}$ FHE library and FHE scheme
$F*_{jk}$: Instance model generated using $j^{th}$ FHE library and FHE scheme
$\mathcal{F}_{jk}^{c\dagger}$: Optimal instance model based on constraint $c_\dagger \in C$
$\mathcal{F}_{j}^{c\dagger}$: Optimal constraint for instance model F model using FHE library $l_j$, where $c_\dagger \in C$
$p_q$: Number of schemes supported by library l
$\lambda_j$: Security level for FHE library j
$\alpha$: Number of FHE libraries
$\mathcal{L}$={$l_1 \ldots l_\alpha$}: set of FHE libraries available
|$\mathcal{F}$|: Number of sub-functions
$f_i \in F$: $i^{th}$ sub computations of F
$\mathcal{F}_{ijk}^{c\dagger}$: Constraint to compute $f_i$ using library $l_j$ and FHE scheme $S_{l_{jk}}$, where $c_\dagger \in C$
$W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}.$$

13. The system of claim 10, wherein the single objective-multi constraint optimization task are implemented by the one or more hardware processors that are further configured by the instructions to perform optimization task using the single objective-multi constraint optimization task as shown below:

$$\mathcal{F}^* = \operatorname{argmin}\left\{F_j \mid F_j = \operatorname{argmin}\{F_{jk} \mid \lambda_j > \lambda\}_{k \in S_{l_j}}, l_j \varepsilon \mathcal{L}\right\},$$

$$F_{jk} = \sum_{i=1}^{|\mathcal{F}|} \mathcal{F}_{ijk}^{c\dagger} x_{ijk}$$

such that $$F_{jk} = \mathcal{W}_\tau * f_{ijk}^\tau + \mathcal{W}_m * f_{ijk}^m + \mathcal{W}_{comm} * f_{ijk}^{comm} + \mathcal{W}_\xi * f_{ijk}^\xi,$$

where $\mathcal{W}_\tau + \mathcal{W}_m + \mathcal{W}_{comm} + \mathcal{W}_\xi = 1$ and $$\Sigma_{i=1}^{|\mathcal{F}|} \mathcal{F}_{ijk}^{c\dagger} x_{ijk} \leq c_{\dagger f}, \Sigma_{k=1}^{|\mathcal{F}|} x_{ijk} = |\mathcal{F}|$$

where
set of constraints is represented by C={$\tau$, m, comm, $\xi$}, $\tau_f$ is the computation time, $m_f$ is the memory consumption, $comm_f$ is the communication cost, $\xi_f$ is the computation cost and $\lambda$ is the security level,
$\mathcal{F}$ is optimal instance model,
F={$f_1, f_2, f_3, \ldots, f_n$}: Set of sub-computations,
$F_{jk}$: Instance model generated using $j^{th}$ FHE library and FHE scheme
$F*_{jk}$: Instance model generated using $j^{th}$ FHE library and FHE scheme
$\mathcal{F}_{jk}^{c\dagger}$: Optimal instance model based on constraint $c_\dagger \in C$
$\mathcal{F}_{j}^{c\dagger}$: Optimal constraint for instance model F model using FHE library $l_j$, where $c_\dagger \in C$
$p_q$: Number of schemes supported by library l
$\lambda_j$: Security level for FHE library j
$\alpha$: Number of FHE libraries
$\mathcal{L}$={$l_1 \ldots l_\alpha$}: set of FHE libraries available
|$\mathcal{F}$|: Number of sub-functions
$f_i \in F$: $i^{th}$ sub computations of F
$\mathcal{F}_{ijk}^{c\dagger}$: Constraint to compute $f_i$ using library $l_j$ and FHE scheme $S_{l_{jk}}$, where $c_\dagger \in C$
$W_{c_\dagger}$: User given priority for constraint computation time where time $\tau$ where $c_\dagger \in C$ $$x_{ijk} = \begin{cases} 1 & \text{If } f_i \text{ can be computed using library } l_j \text{ and FHE scheme } S_{l_{jk}} \\ 0 & \text{otherwise} \end{cases}.$$

14. The system of claim 10, wherein the selection of set of FHE parameters and optimal configuration of the set of FHE parameters are implemented by the one or more hardware processors that are further configured by the instructions to select the set of FHE parameters and the optimal configuration of the set of FHE parameters from the exhaustive set of FHE scheme parameters based on a circuit depth, a level of accuracy and the set of supporting features wherein the circuit depth and the level of accuracy is determined based on a multiplication operation between a set of nodes in the meta model trees of the meta-models.

15. A computer program product comprising a non-transitory computer readable medium having a computer readable program embodied therein, wherein the computer readable program, when executed on a computing device, causes the computing device to receive the application, a set of input data to the application, a set of constraints and a user requirement, wherein the set of input data are indicative of one or more functions performed by the application, the set of constraints are indicative of functional performance and cost of the application, and the user requirement is indicative of an optimization task to be performed as per a user's requirement;

generate, a set of inter-connected meta models based on an abstract data type (ADT) technique, wherein the set of inter-connected meta models comprises a plurality of meta model trees, wherein each of the plurality of meta model trees comprises a plurality of nodes that indicate a fully homomorphic encryption (FHE) library, a FHE functionality associated with the FHE library and an optimal configuration of the associated FHE functionality;

generate a set of instance models for the application based on the set of constraints using the set of inter-connected meta models, wherein each of the set of instance models comprises an FHE library, the FHE functionality associated with the FHE library and the optimal configuration of the associated FHE functionality identified from the meta models based on the set of constraints;

optimize each of the set of instance models based on the optimization task to obtain a decision for each of the set of constraints, wherein the optimization task is identified from a set of optimization tasks based on the user requirement, the set of optimization tasks comprises one of a multi objective-multi constraint optimization task and a single objective-multi constraint optimization task;
identify a pre-defined number of optimal instance models from the set of instance models using a ranking technique, wherein the ranking technique is performed based the set of constraints; and
display an optimal instance model, wherein the optimal instance model is indicative of the privacy preservation using FHE to be enabled in the application.

* * * * *